US012762228B2

(12) United States Patent
Devi et al.

(10) Patent No.: US 12,762,228 B2
(45) Date of Patent: Oct. 13, 2026

(54) ATTACK SIMULATION ON A TEST DEVICE

(71) Applicant: Cisco Technology, Inc., San Jose, CA (US)

(72) Inventors: Madem Ramanjaneya Devi, Bangalore (IN); Bindiya Vasudevan Syamala, Kerala (IN); Datthathreya Seetharama, Bengaluru (IN)

(73) Assignee: Cisco Technology, Inc., San Jose, CA (US)

(*) Notice: Subject to any disclaimer, the term of this patent is extended or adjusted under 35 U.S.C. 154(b) by 111 days.

(21) Appl. No.: 18/532,341

(22) Filed: Dec. 7, 2023

(65) Prior Publication Data

US 2025/0190548 A1 Jun. 12, 2025

(51) Int. Cl.
*G06F 21/00* (2013.01)
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS 10,320,828 B1 6/2019 Derbeko et al.
2015/0169878 A1* 6/2015 Nunez Di Croce .. G06F 16/951 726/25
2017/0085588 A1 3/2017 Laidlaw et al.
2017/0223046 A1* 8/2017 Singh .................. H04L 63/1491
2019/0245883 A1* 8/2019 Gorodissky ......... H04L 63/1433
2020/0280576 A1* 9/2020 Key ......................... H04L 63/20
2020/0329072 A1* 10/2020 Dubois .................. G08B 21/18
2021/0021636 A1 1/2021 Sbandi
2021/0021644 A1* 1/2021 Crabtree ............. H04L 63/1433
2022/0210200 A1* 6/2022 Crabtree ............. H04L 63/1425
2022/0210202 A1* 6/2022 Crabtree ............... G06F 21/577
2023/0132703 A1 5/2023 Marsenic et al.
2023/0156032 A1* 5/2023 Andriani ............. H04L 63/1433 726/22
2023/0259632 A1* 8/2023 Marciano ............. G06F 21/554 726/25
2023/0336581 A1* 10/2023 Dunn .................... G06F 21/577
2023/0370439 A1* 11/2023 Crabtree ............. H04L 63/0428

FOREIGN PATENT DOCUMENTS

CN 112769821 7/2022

* cited by examiner

*Primary Examiner* — Christopher B Robinson
(74) *Attorney, Agent, or Firm* — Polsinelli P.C.

(57) ABSTRACT

Method, system, and/or computer readable medium for simulating attacks on a device including: obtaining one or more attack behaviors from a threat intelligence source; generating an attack using one or more of the attack behaviors and a destination test device; transmitting the generated attack through a data interface to the destination test device; pulling detection data from the destination test device through a management interface; and generating a report that identifies any security gaps in the destination test device.

20 Claims, 3 Drawing Sheets

ATTACK SIMULATION ON A TEST DEVICE

BACKGROUND

Attacks on networks continues to increase. The attack on a network can be to one or more devices that connected to the network. While defensive strategies are increased in recent years, the testing of the network and security might not prevent the latest versions of attacks.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Systems, methods, and computer-readable media are provided for simulating attacks on a device. An example method can include obtaining one or more attack behaviors from a threat intelligence source. The method can also include generating an attack using one or more of the attack behaviors and a destination test device. The method can further include transmitting the generated attack through a data interface to the destination test device. Still further, the method can include pulling detection data from the destination test device through a management interface. Additionally, the method can include generating a report that identifies any security gaps in the destination test device.

An example system can include one or more processors and at least one computer-readable storage medium storing instructions which, when executed by the one or more processors, cause the one or more processors to obtain one or more attack behaviors from a threat intelligence source; generate an attack using one or more of the attack behaviors and a destination test device; transmit the generated attack through a data interface to the destination test device; pull detection data from the destination test device through a management interface; generate a report that identifies any security gaps in the destination test device.

An example non-transitory computer-readable storage medium having stored therein instructions which, when executed by a processor, cause the processor to obtain one or more attack behaviors from a threat intelligence source; generate an attack using one or more of the attack behaviors and a destination test device; transmit the generated attack through a data interface to the destination test device; pull detection data from the destination test device through a management interface; generate a report that identifies any security gaps in the destination test device.

Figure 1:
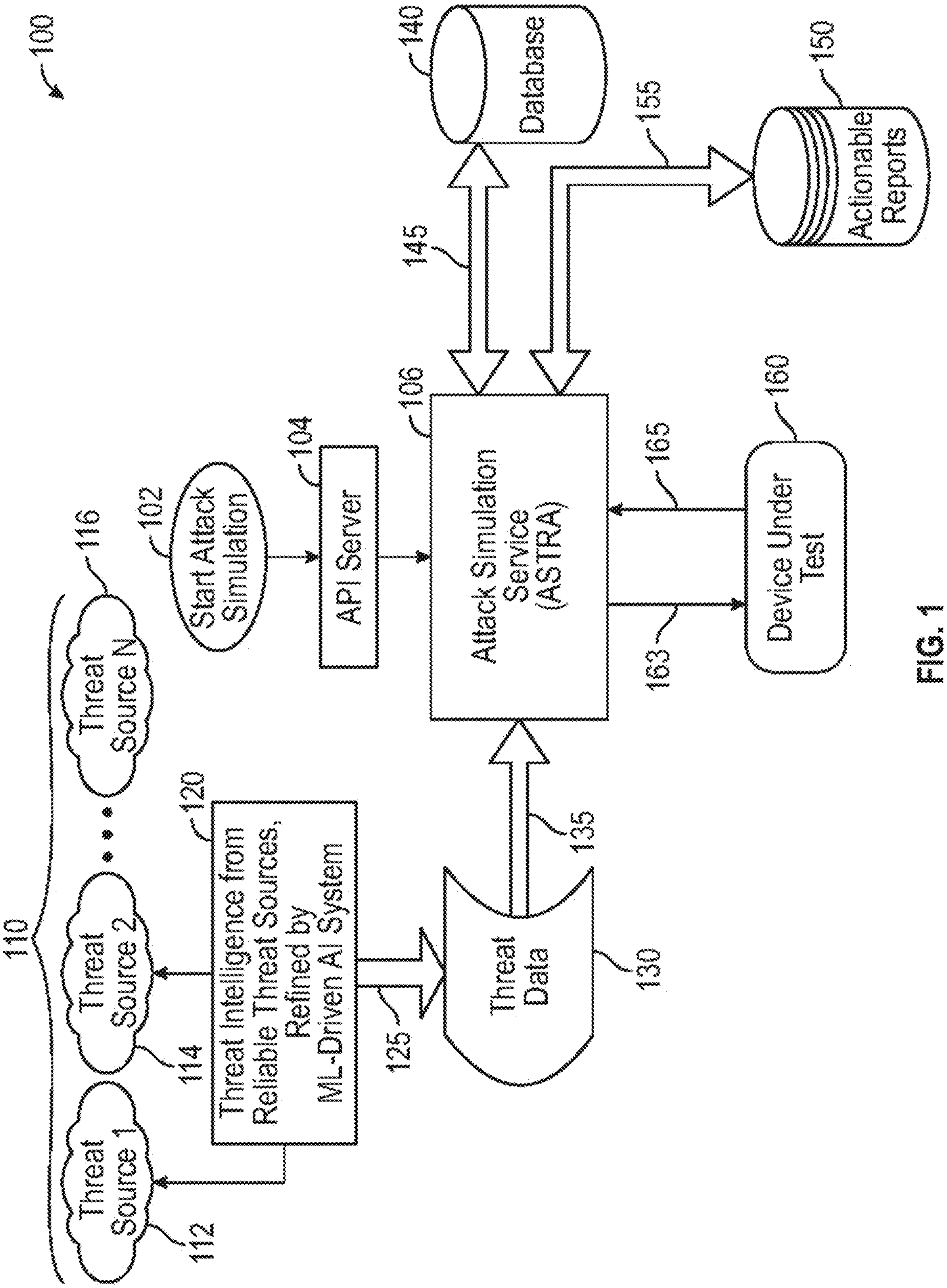
FIG. 1 illustrates an example of system according to the present disclosure.

FIG. 1 illustrates an example of a system 100 according to the present disclosure. The system 100 includes an attack simulation service (ASTRA) 106. The ASTRA 106 can include a processor and memory. In other examples, ASTRA 106 is running on a cloud service. ASTRA 106 can include a backend server that connects to an application programing interface (API) to a graphical user interface (GUI). The backend server can also be connected to an email security appliance, a web security appliance, a security management appliance, and a secure email encryption service. Additionally, in at least one example, the backend server can be coupled to a job scheduler. While the term backend server has been used herein, the backend server could be replaced with a cloud based service to provide functionality similar to that of a backend server. ASTRA 106 can be coupled through an API 104 to a computer or other device that includes a GUI that allows for starting attack simulation 102. Additionally, in at least one example the API 104 can be coupled to the computer or other device through an API server. The start attack simulation 102 can be a prompt on a user interface. In other examples, the start attack simulation 102 can provide for a variety of different options that can be deployed by the operator in constructing the attack. For example, the user interface can provide options for an operator to select what type of attack is desired from the compiled attacks, to select all known attacks, to select a particular application to attempt the attacks on, and the like.

The system can collect threat data 130 from a plurality of threat sources 110. The plurality of threat sources 110 can include a first threat source 112, a second threat source 114, and a number of threat sources until threat source number N 116. The total number of threat sources 110 can be described as N, which can be a whole number greater than 2. Examples of possible threat sources 110 include one or more threat intelligence feeds, cyber threat reports, phishing reports, malware reports, ransomware reports, denial of service reports, and other types of reports. Each of these can be from a plurality of difference sources which can include security companies, governmental agencies, open source communities, and the like.

The present disclosure also includes the ability to collect the threat intelligence from the plurality of threat sources 110 and apply machine learning (ML) to generate a refined set of threat intelligence data at block 120. The ML algorithm can also include one or more types of artificial intelligence. The ML algorithm can implement using attack indicators such as indicators of compromise that include URL ML parameters, attachment ML parameters, domain ML parameters, and IP address ML parameters. The threat intelligence data can be collected and transmitted 125 to a threat data 130 location. ASTRA 106 can pull 135 the threat data 130 for construction of the attack. Additionally, the system 100 can include one or more databases 140. The one or more databases 140 can store attack information. The attack information can be based upon the threat data 130. ASTRA 106 can push and/or pull 145 the attack information from the database 140.

Once the information on the attack simulation has been collected, ASTRA 106 can inject the attack through a data interface 163 to a device under test 160. The device under test 160 can be an individual computer. In another example, the device under test 160 can be a server. In yet another example, the device under test 160 can be a cloud based service. ASTRA 106 can pull detection data through a management interface 165. Once ASTRA 106 receives the detection data, ASTRA 106 can generate reports and push and pull reports 155 to an actional reports 150 repository. The actional reports can be used to pinpoint security gaps in the device under test 160. The actional reports 150 can be displaced on a GUI. In one example, the attacks can be focused on a GUI and the actional reports can pinpoint security gap in the GUI. In other examples, the device under test 160 can include an email application and the actional reports 150 can pinpoint security gaps in the email application on the device under test 160. In another example, the device under test 160 can include a web security application and the actional reports 150 can pinpoint security gaps in the web security application.

Figure 2:
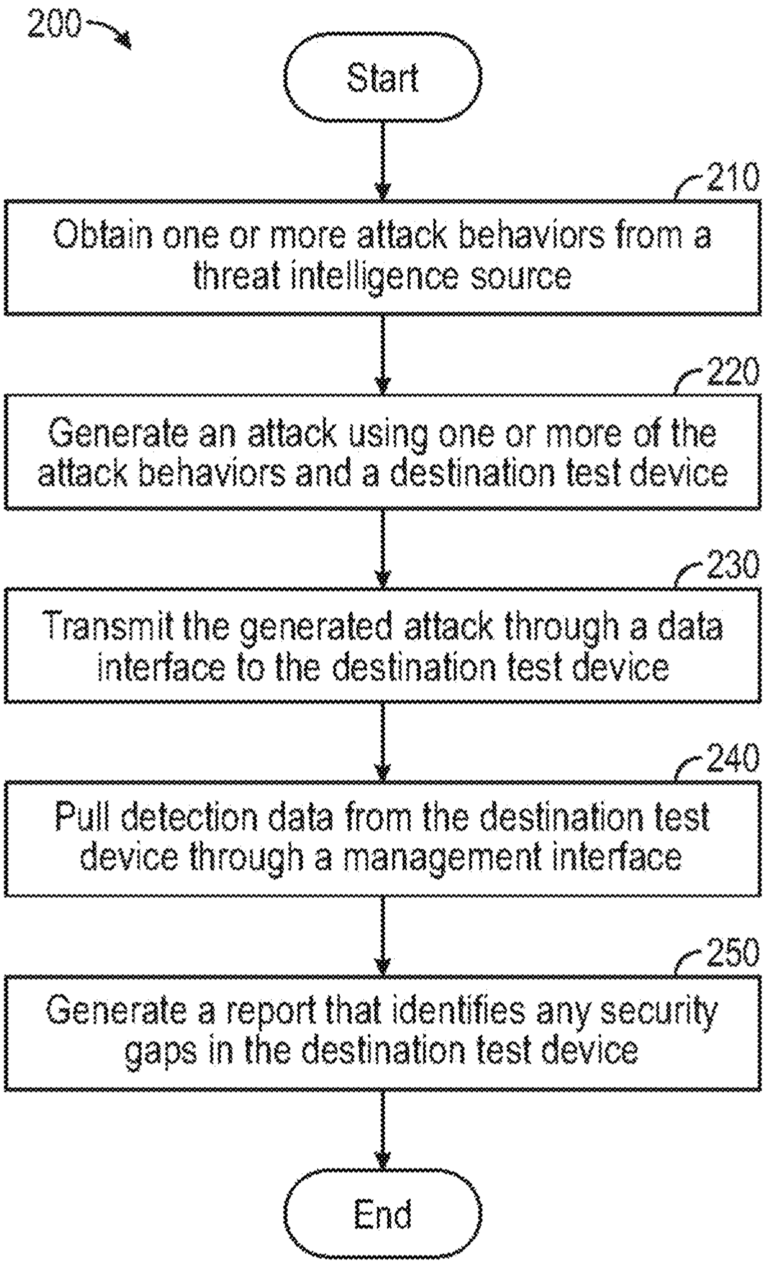
FIG. 2 illustrates an example of a method according to the present disclosure.

FIG. 2 illustrates an example method 200 for simulating attacks on a device. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method includes obtaining one or more attack behaviors from a threat intelligence source at block 210. For example, the attack simulation service (ASTRA) illustrated in FIG. 1 may obtain one or more attack behaviors from a threat intelligence source. Additionally, the method can include receiving one or more parameters for the attack through an application program interface (API). The parameters can be generated by a GUI that is coupled to the API. The parameters can include selecting a particular type of an attack to be implemented, a target application for the attack, a selection of different attack techniques such as phishing, malware, ransomware, denial of service, cyber threats, and the like. Additionally, the method can receive device and attack data from a database. Furthermore, the method can include transmitting device and attack data to the database. The one or more attack behaviors can be related to attack behaviors that are transmitted via electronic mail (email). In other examples, the one or more attack behaviors can be related to attack behaviors that exploit a GUI. In yet another example, the attack behaviors can be related to a particular application running on the destination test device.

According to some examples, the method includes generating an attack using one or more of the attack behaviors and a destination test device at block 220. For example, the ASTRA illustrated in FIG. 1 may generate an attack using one or more of the attack behaviors and a destination test device. The destination test device can be a device under testing as described above. The method can include generating the attack by refining the one or more attack behaviors from the threat intelligence source based upon a machine learning algorithm.

According to some examples, the method includes transmitting the generated attack through a data interface to the destination test device at block 230. For example, the ASTRA illustrated in FIG. 1 may transmit the generated attack through a data interface to the destination test device.

According to some examples, the method includes pulling detection data from the destination test device through a management interface at block 240. For example, the ASTRA illustrated in FIG. 1 may pull detection data from the destination test device through a management interface.

According to some examples, the method includes generating a report that identifies any security gaps in the destination test device at block 250. For example, the ASTRA illustrated in FIG. 1 may generate a report that identifies any security gaps in the destination test device. In at least one example, the report can contain information about security gaps in a user interface of the destination test device. In at least another example, the report can contain information about security gaps in an email application. In at least one example, the report can contain information about security gaps in a web security appliance. The ASTRA would be able to generate corresponding web attacks in the form of web traffic that forms an attack. As the security systems are updated and modified, the attacks can be repeated and the reports monitored and/or compared to determine if the improvements that were made to the destination test device resulted in improvement to security or a decrease in the security of the destination test device.

Figure 3:
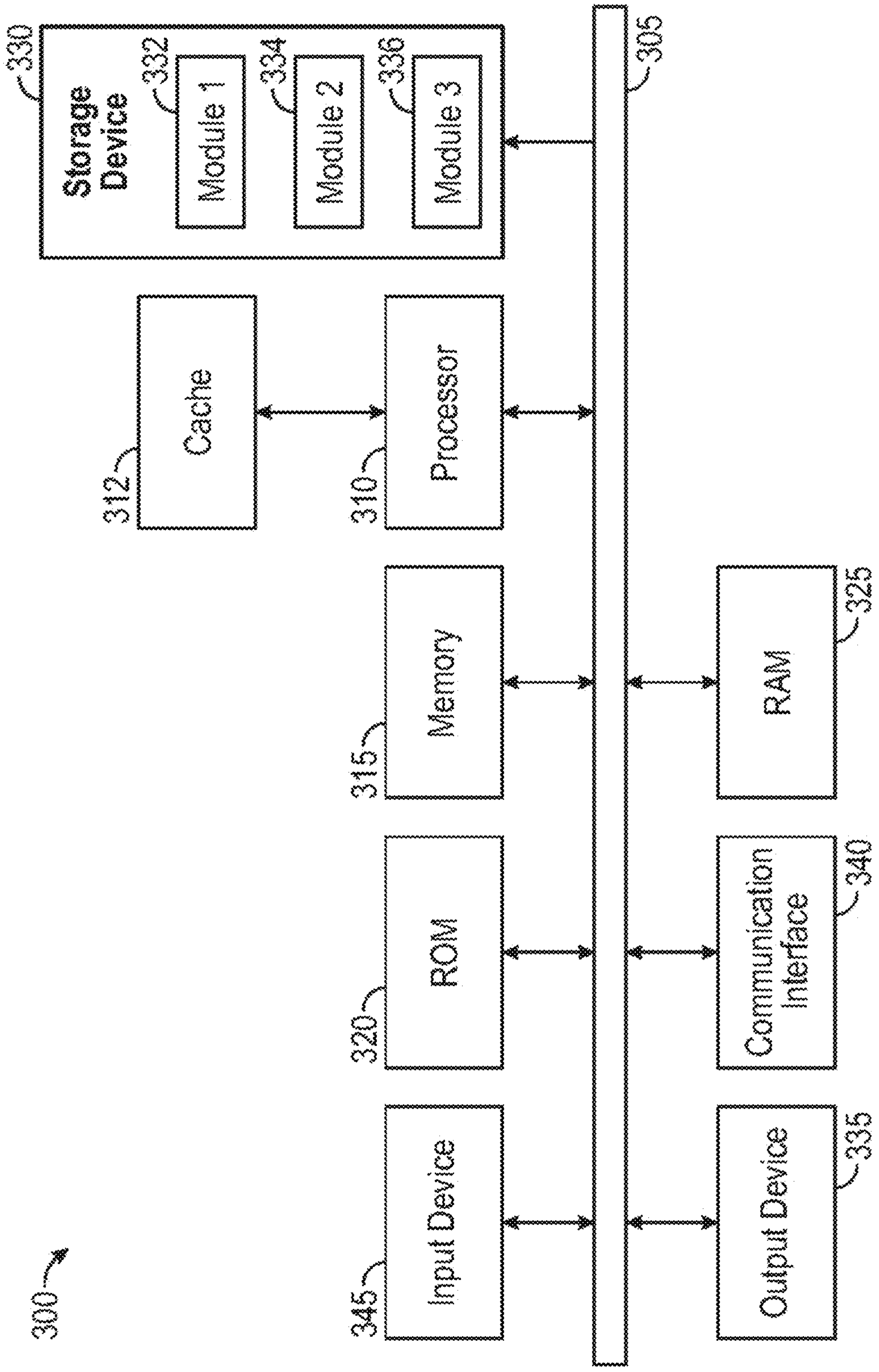
FIG. 3 shows an example of computing system, which can be for example any computing device that can implement components of the system.

FIG. 3 shows an example of computing system 300, which can be for example any computing device making up one or more devices in the network topology of FIG. 1 or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments computing system 300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read only memory (ROM) 320 and random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any hardware arrangement and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances the present technology may be presented as including individual functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method for simulating attacks on a device, the method comprising: obtaining one or more attack behaviors from a threat intelligence source; generating an attack using the one or more of the attack behaviors and a destination test device; transmitting the generated attack through a data interface to the destination test device; pulling detection data from the destination test device through a management interface; generating a report that identifies any security gaps in the destination test device.

Aspect 2. The method of Aspect 1, further comprising: receiving one or more parameters for the attack through an application program interface; receiving device and attack data from a database.

Aspect 3. The method of any of Aspects 1 to 2, further comprising: transmitting device and attack data to the database.

Aspect 4. The method of any of Aspects 1 to 3, wherein the report contains information about security gaps in a user interface of the destination test device.

Aspect 5. The method of any of Aspects 1 to 4, wherein the one or more attack behaviors are related to attack behaviors that are transmitted via electronic mail.

Aspect 6. The method of any of Aspects 1 to 5, wherein generating the attack further comprises refining the one or more attack behaviors from the threat intelligence source based upon a machine learning algorithm.

Aspect 7. The method of any of Aspects 1 to 6, wherein the one or more attack behaviors are user interface behaviors, and the report identifies security gaps in a user interface of the destination test device.

Aspect 8. A system includes a storage (implemented in circuitry) configured to store instructions and a processor. The processor configured to execute the instructions and cause the processor to: obtain one or more attack behaviors from a threat intelligence source; generate an attack using the one or more of the attack behaviors and a destination test device; transmit the generated attack through a data interface to the destination test device; pull detection data from the destination test device through a management interface; generate a report that identifies any security gaps in the destination test device.

Aspect 9. The system of Aspect 8, wherein the processor is configured to execute the instructions and cause the processor to: receive one or more parameters for the attack through an application program interface; receive device and attack data from a database.

Aspect 10. The system of any of Aspects 8 to 9, wherein the processor is configured to execute the instructions and cause the processor to: transmit device and attack data to the database.

Aspect 11. The system of any of Aspects 8 to 10, wherein the report contains information about security gaps in a user interface of the destination test device.

Aspect 12. The system of any of Aspects 8 to 11, wherein the one or more attack behaviors are related to attack behaviors that are transmitted via electronic mail.

Aspect 13. The system of any of Aspects 8 to 12, wherein generating the attack further comprises refining the one or more attack behaviors from the threat intelligence source based upon a machine learning algorithm.

Aspect 14. The system of any of Aspects 8 to 13, wherein the one or more attack behaviors are user interface behaviors, and the report identifies security gaps in a user interface of the destination test device.

Aspect 15. A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: obtain one or more attack behaviors from a threat intelligence source; generate an attack using the one or more of the attack behaviors and a destination test device; transmit the generated attack through a data interface to the destination test device; pull detection data from the destination test device through a management interface; generate a report that identifies any security gaps in the destination test device.

Aspect 16. The computer readable medium of Aspect 15, wherein the processor is configured to execute the computer readable medium and cause the processor to: receive one or more parameters for the attack through an application program interface; receive device and attack data from a database.

Aspect 17. The computer readable medium of any of Aspects 15 to 16, wherein the processor is configured to execute the computer readable medium and cause the processor to: transmit device and attack data to the database.

Aspect 18. The computer readable medium of any of Aspects 15 to 17, wherein the report contains information about security gaps in a user interface of the destination test device.

Aspect 19. The computer readable medium of any of Aspects 15 to 18, wherein the one or more attack behaviors are related to attack behaviors that are transmitted via electronic mail.

Aspect 20. The computer readable medium of any of Aspects 15 to 19, wherein generating the attack further comprises refining the one or more attack behaviors from the threat intelligence source based upon a machine learning algorithm.

Aspect 21. The computer readable medium of any of Aspects 15 to 20, wherein the one or more attack behaviors are user interface behaviors, and the report identifies security gaps in a user interface of the destination test device.

What is claimed is:

1. A method for simulating attacks on a device, the method comprising:
- obtaining one or more attack behaviors from a threat intelligence source;
- generating, at an attack simulation system, an attack using the one or more of the attack behaviors and a destination test device, wherein the generated attack is configured to target a vulnerability of an application running on the destination test device, and wherein the destination test device is separate from and external to the attack simulation system;
- transmitting the generated attack through a data interface to the destination test device;
- pulling detection data from the destination test device through a management interface; and
- generating a report that identifies any security gaps in the destination test device.

2. The method of claim 1, further comprising:
- receiving one or more parameters for the attack through an application program interface; and
- receiving device and attack data from a database.

3. The method of claim 2, further comprising:
- transmitting device and attack data to the database.

4. The method of claim 1, wherein the report contains information about security gaps in a user interface of the destination test device.

5. The method of claim 1, wherein the one or more attack behaviors are related to attack behaviors that are transmitted via electronic mail.

6. The method of claim 1, wherein generating the attack further comprises refining the one or more attack behaviors from the threat intelligence source based upon a machine learning algorithm.

7. The method of claim 1, wherein the one or more attack behaviors are user interface behaviors, and the report identifies security gaps in a user interface of the destination test device.

8. A system comprising:
- a storage configured to store instructions; and
- a processor configured to execute the instructions and cause the processor to:
  - obtain, at an attack simulation system, one or more attack behaviors from a threat intelligence source;
  - generate an attack using the one or more of the attack behaviors and a destination test device, wherein the generated attack is configured to target a vulnerability of an application running on the destination test device, and wherein the destination test device is separate from and external to the system;
- transmit the generated attack through a data interface to the destination test device;
- pull detection data from the destination test device through a management interface; and
- generate a report that identifies any security gaps in the destination test device.

9. The system of claim 8, wherein the processor is configured to execute the instructions and cause the processor to:
- receive one or more parameters for the attack through an application program interface; and
- receive device and attack data from a database.

10. The system of claim 9, wherein the processor is configured to execute the instructions and cause the processor to:
- transmit device and attack data to the database.

11. The system of claim 8, wherein the report contains information about security gaps in a user interface of the destination test device.

12. The system of claim 8, wherein the one or more attack behaviors are related to attack behaviors that are transmitted via electronic mail.

13. The system of claim 8, wherein generating the attack further comprises refining the one or more attack behaviors from the threat intelligence source based upon a machine learning algorithm.

14. The system of claim 8, wherein the one or more attack behaviors are user interface behaviors, and the report identifies security gaps in a user interface of the destination test device.

15. A non-transitory computer readable medium comprising instructions, the instructions, when executed by a computing system, cause the computing system to:

obtain, at an attack simulation system, one or more attack behaviors from a threat intelligence source;

generate an attack using the one or more of the attack behaviors and a destination test device, wherein the generated attack is configured to target a vulnerability of an application running on the destination test device, and wherein the destination test device is separate from and external to the computing system;

transmit the generated attack through a data interface to the destination test device;

pull detection data from the destination test device through a management interface; and generate a report that identifies any security gaps in the destination test device.

16. The computer readable medium of claim 15, further comprises instructions that, when executed by the computing system, cause the computing system to:

receive one or more parameters for the attack through an application program interface; and receive device and attack data from a database.

17. The computer readable medium of claim 16, further comprises instructions that, when executed by the computing system, cause the computing system to:

transmit device and attack data to the database.

18. The computer readable medium of claim 15, the report contains information about security gaps in a user interface of the destination test device.

19. The computer readable medium of claim 15, the one or more attack behaviors are related to attack behaviors that are transmitted via electronic mail.

20. The computer readable medium of claim 15, generating the attack further comprises refining the one or more attack behaviors from the threat intelligence source based upon a machine learning algorithm.

* * * * *